(12) United States Patent
Shefer

(10) Patent No.: US 6,334,098 B1
(45) Date of Patent: Dec. 25, 2001

(54) INCREASING THE DYNAMIC RANGE OF IMAGE SENSORS

(75) Inventor: Mordecai Shefer, Haifa (IL)

(73) Assignee: Truesight Ltd., Haifa (IL)

( * ) Notice: Subject to any disclaimer, the term of this patent is extended or adjusted under 35 U.S.C. 154(b) by 0 days.

(21) Appl. No.: 09/101,362

(22) PCT Filed: Nov. 6, 1997

(86) PCT No.: PCT/IL97/00356

§ 371 Date: Jul. 7, 1998

§ 102(e) Date: Jul. 7, 1998

(87) PCT Pub. No.: WO98/21743

PCT Pub. Date: May 22, 1998

(51) Int. Cl.[7] .................................................. H01L 27/148
(52) U.S. Cl. ........................................ 702/189; 250/208.1
(58) Field of Search .......................... 250/208.1, 214 A, 250/214 AG, 214 R, 208.2; 348/294, 300; 382/312, 321; 702/66, 28, 40, 127, 159, 172, 183, 190, 191

(56) References Cited

U.S. PATENT DOCUMENTS

| | | | |
|---|---|---|---|
| 4,786,818 | * 11/1988 | Mead et al. | 250/578 |
| 4,980,762 | * 12/1990 | Heeger et al. | 358/93 |
| 5,365,603 | * 11/1994 | Karmann | 382/48 |
| 5,665,958 | * 9/1997 | Rudd et al. | 250/205 |

FOREIGN PATENT DOCUMENTS 2-50584-A * 2/1990 (JP) .............................. H04N/5/335

* cited by examiner

Primary Examiner—Marc S. Hoff
Assistant Examiner—Edward Raymond
(74) Attorney, Agent, or Firm—Mark M. Friedman

(57) ABSTRACT

A device that is to be electrically connected to each one of the photo-detector output signals in an image sensor array is comprised of an arrangement of capacitors ($C_{01}$, $C_{02}$), resistors ($R_{01}$, $R_{02}$, $R_{03}$), amplifiers, comparators ($C_m$), and switches ($S_1$, $S_2$). This arrangement is suitable to execute real time estimation of the time derivatives of said photo-detector output signals.

22 Claims, 3 Drawing Sheets

INCREASING THE DYNAMIC RANGE OF IMAGE SENSORS

Figure 1A:
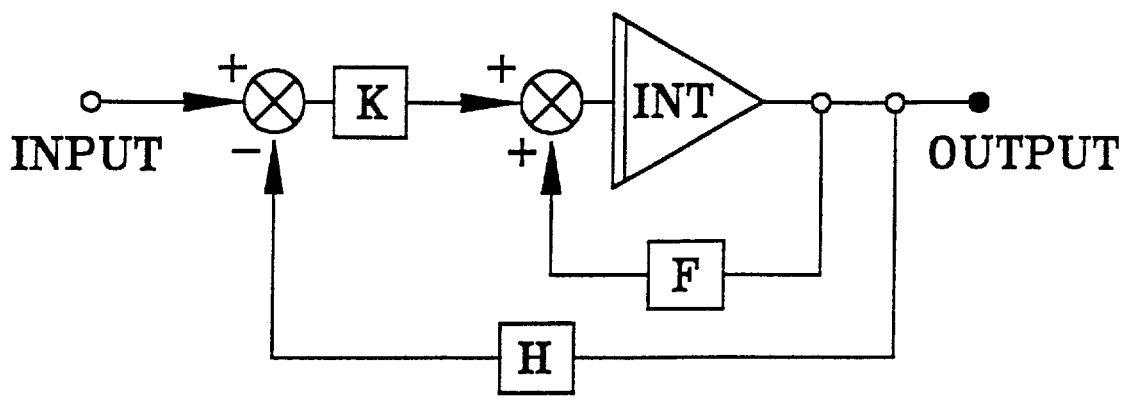
Figure 1B:
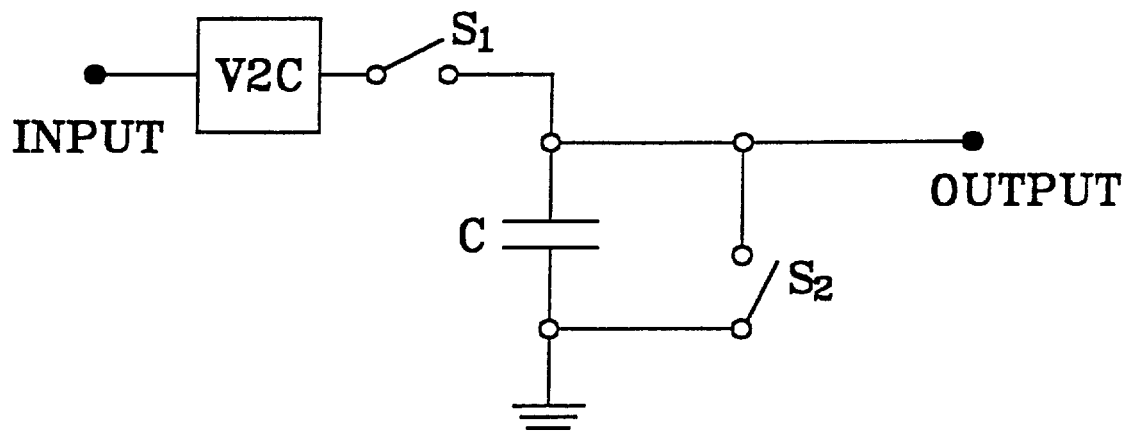
Figure 2A:
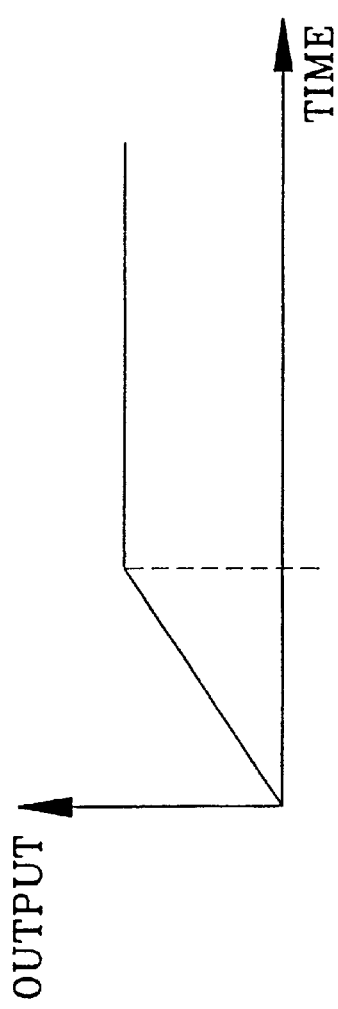
Figure 2B:
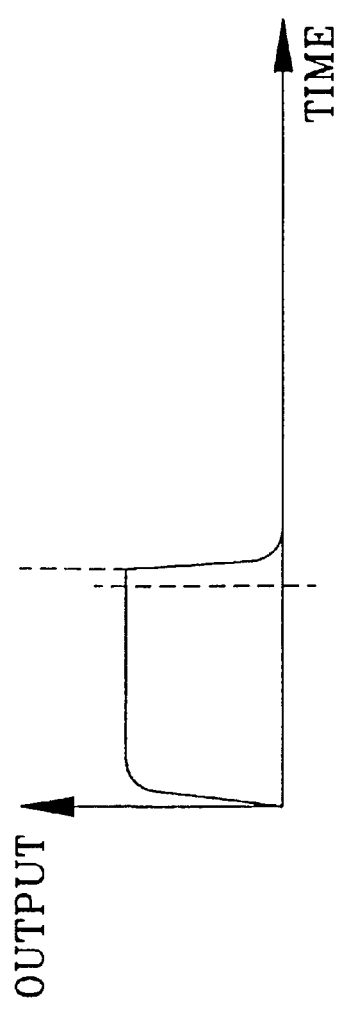
Figure 2C:
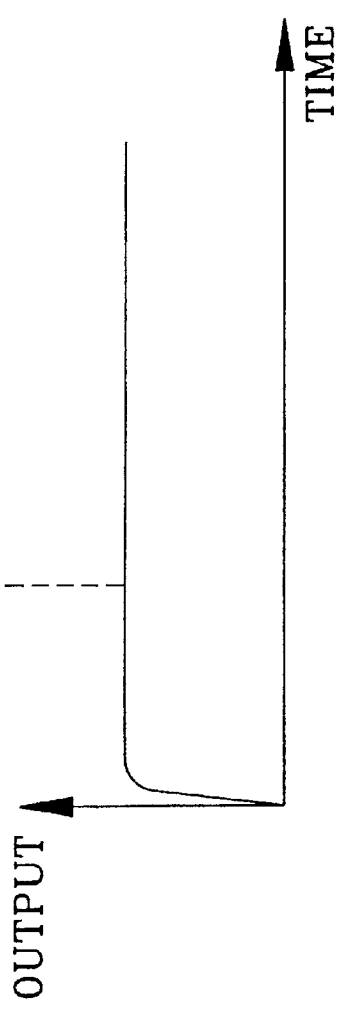
Figure 3:
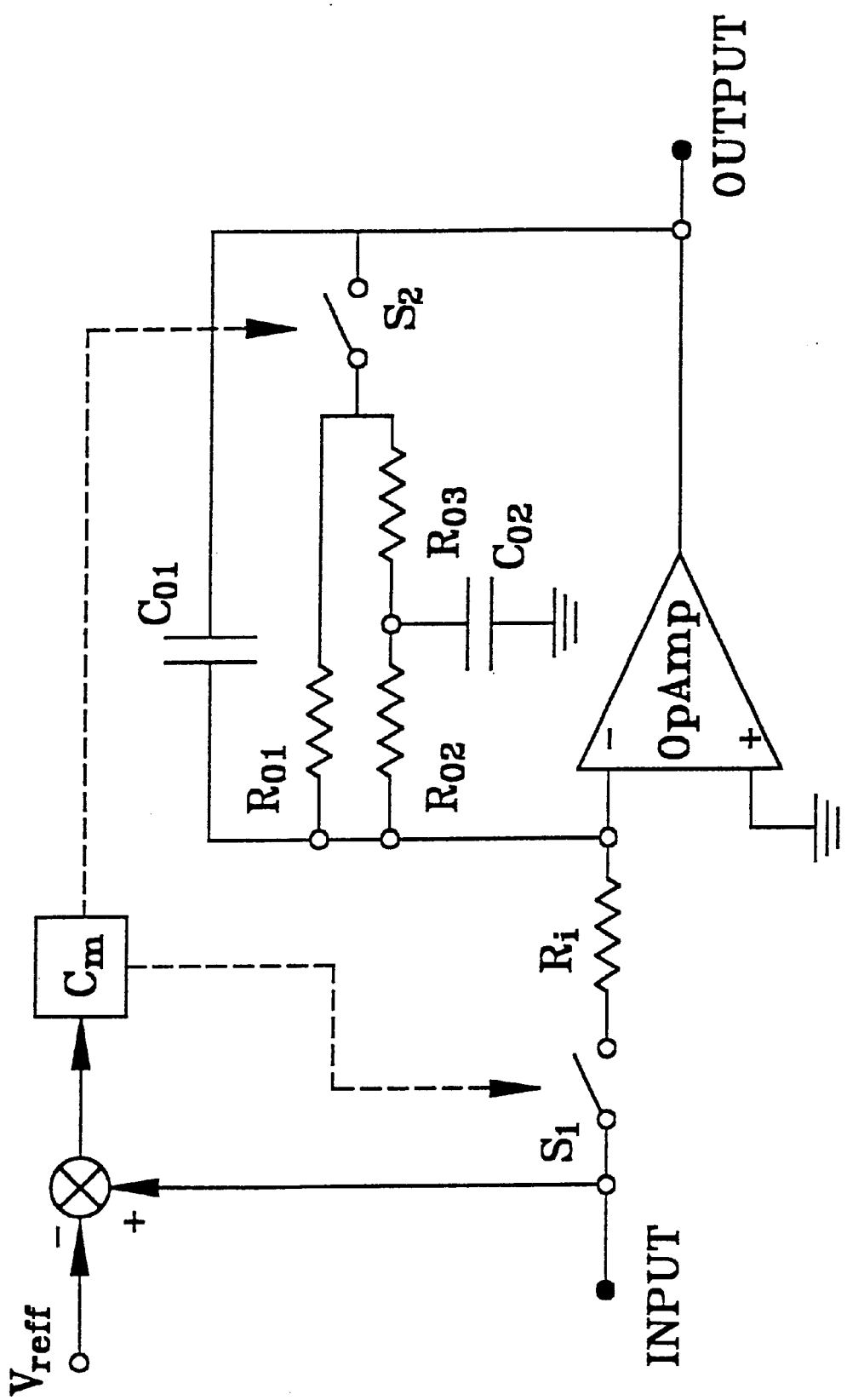

This is a national phase application claiming priority from PCT/IL97/00356, filed Nov. 6, 1997, which, in turn, claims priority from IL 119596, filed Nov. 11, 1996.

FIELD OF THE INVENTION

The present invention relates generally to electronic sensors and cameras that acquire images, such as video cameras in the visible and invisible spectra of light. More specifically, the present invention relates to electronic circuitry and arrangements that perform in real time in order to increase the dynamic range of electronic image sensors and cameras.

BACKGROUND OF THE INVENTION

The Dynamic Range (DR) of images of scenarios and views is defined as the ratio between the intensity of the brightest spot in the image and the minimum significant differential of intensities across the image. The image DR determines how many distinct levels of intensities a subsequent user of an image must employ in order to fully exploit the information conveyed by the image. In sensor acquired images—the minimum significant cross-image difference is bounded by the sensor noise, and on the other hand—the maximum acquirable signal is bounded by the sensor saturation level. One can thus realize that the DR of an acquired image is in fact bounded by the Saturation to Noise Ratio (SatNR) of the acquiring sensor. The DR of natural views and scenarios may exceed ten to the tenth power ($10^{10}$). The human eye, as well as the eyes of animals, can accommodate such huge DR without too much of an apparent difficulty. This implies that the self generated noise of biological image sensors is sufficiently small compared to their saturation level, so that the SatNR can match the DR of natural views and scenarios. However, the SatNR of common electronic image sensors such as Charged Coupled Devices (CCD) does not usually exceed several hundreds, say 256. This in turn implies that all the details in the original view whose contrasts are smaller than $\frac{1}{256}$ of the brightest spot, but still are bigger than say, ten to the minus tenth of the same, will totally disappear in the process of acquisition.

Thus, it is the purpose of many inventions including the present, to increase the DR of image sensors in order to diminish the acquisition losses as much as possible. The inherent sensor sensitivity, which is how much of electrical charge is generated by the sensor per a given number of photons that hit its receiving surface, depends on its geometric and optical properties and the quality of the materials that make it. Traditionally, the essence of the imaging process, which is to say—the conversion of images from levels of light intensities into levels of readable electrical charges or voltages—is the exposure of an appropriate array of sensors to an adequately focused image for a prescribed period of time, letting those sensors collect photons and convert them into electrical charges. With time those charges are accumulated, so that at the end of the exposure interval the amount of the net accumulated charge at a particular sensor reflects the magnitude of the photon flux, or the light intensity that belongs to the spot of the image that has been focused on that particular sensor. An obvious way to influence the sensors responsivity to light flux, is varying the exposure time interval, also referred to as "The Integration Time". Another obvious such way is to change the sensor optical aperture. Increasing the exposure time and/or the aperture enable the sensors to integrate more photons at every spot in the field of view, hence causes a proportional increase of the accumulated charges. However, besides other side effects of overly increased exposure interval and aperture size, there is a maximum amount of charge that a light cell can hold. When this maximum level is reached in a certain cell, it becomes saturated and ceases to reflect the light variations of the original view. At this point this cell can not function as an imaging device anymore. It is commonly said that the whole image is in saturation when considerable areas of neighboring cells are saturated, causing these areas of the output image to appear as white uniform zones that do not show any of the original view. The only way to increase the DR of an image sensor of a given sensitivity, is to increase its maximum Signal to Noise Ratio (SNR). The maximum SNR of a sensor is the sensor Saturation to Noise Ratio (SatNR). Thus, in order to increase the DR of a sensor one can either try to increase its saturation level, or one can try to reduce the sensor self generated noise. There are two principle kinds of self generated noise:

a). Temporal noise, a stochastic process that depends mainly on the size and temperature of the active part of the sensor, and b). A so called "Fixed Pattern Noise" that is associated with sensors that consist of arrays of image detectors, also called "Light Cells". Most of the fixed pattern noise is originated in the initial, or bias voltage that a light cell may have prior to its exposure to light. In arrays of sensors those bias voltages may vary from one sensor to another, so that the exposure of the array to an absolutely uniform, so called "Flat Field" input image, will still result in a non uniform output image that merely reflects the variations in the sensors bias terms. Reduction of temporal noise is done by reducing either, or both the sensor size and its operating temperature. Reduction of the fixed pattern noise is done traditionally by improving the uniformity between the light cells inside the array, and by using various methods of subtraction or compensation of the fixed pattern, or as it also called, the flat field image.

THE PRIOR ART

Temporal noise reduction by cooling is done in CCD cameras made by many manufacturers. One example is Reticon Corp. in U.S.A. Fixed pattern compensation is done in real time hardware by CID Corp., U.S.A. Flat field subtraction is done in real time software by Coreco Corp., Canada. I-Sight Corp. from Israel has introduced the multiple exposure technique in order to increase CCD sensors DR by increasing their maximum acquirable light level. In this method a saturated zone from a longer exposure is replaced by its replica from a shorter one. It can be shown however, that the maximum possible gain of DR in this method is in a factor of two, or a single bit in a binary/digital representation.

SUMMARY OF THE INVENTION

According to the present invention, the photon flux that reaches each photodetector in an array of sensors is estimated in real time via an optimal estimation logic, also known as Kalman Filter. The essence of the optimal estimation concept is that the desired estimate of the photon flux is obtained via a weighted combination of several time derivatives of the sensors outputs, and not just the zero'th derivative, as is done traditionally. In this combination of derivatives the first derivative plays a major role. The estimation processes are performed individually and simultaneously for all the light cells. They start together at the beginning of the exposure interval, but when the outputs of individual light cells are nearing saturation, their associated estimation processes are automatically terminated. The present estimators mainly sense the first derivative, or the slope of the signal at each light cell output. This slope is on one hand a measure of the light flux that reaches a detector, and on the other hand its value is independent of the exposure time, hence it is totally isolated from the effect of saturation. The integration time in this method influences only the SNR of the estimated result. Thus, using for example, the longest possible exposure and the largest available aperture, the present invention enables one to exploit the maximum achievable SNR of a particular sensor, and at the same time to avoid the saturation effect altogether. Also, the fact that the output of the present device represents mainly the slope of the sensors output, effectively eliminates the fixed pattern noise from the acquired image. Thus, the present invention makes the DR of a sensor depends only on the original image DR and the sensor temporal noise.

BRIEF DESCRIPTIONS OF THE DRAWINGS

FIG. No. 1(A) is a general description of a Kalman Filter arrangement, that is electrically connected to each of the sensor light cells. It consists of a set of linear integrators INT whose inputs are connected to the light cell. The set of the integrators outputs which is also the output set of the present invention apparatus, is fed back once to the integrators inputs through a gain matrix F, and second, through a gain matrix H it is subtracted from the light cell output and the difference is then added to the integrators inputs through a gain matrix K.

FIG. No. 1(B) shows one possible way of a realization of a switchable integrator. In this Figure, the input voltage is connected to a capacitor C through a voltage-to-current amplifier/converter V2C and an input analog switch $S_1$. The capacitor can be short-circuited by an output analog switch $S_2$. The integrator output in this Figure is the voltage across the capacitor.

FIG. No. 2 shows typical forms of three signals as they evolve with time inside the Kalman Filter. The signal of FIG. No. 2(A) is the estimated, or filtered version of the light cell output. FIG. No. 2(B) is the estimate of the time derivative, or the local slope, of the light cell output. FIG. No. 2(C) is a replica of the above estimated slope of FIG. No. 2(B), where the last value that appears just prior to saturation is held fixed by analog switches until the end of the readout.

FIG. No. 3 shows a compact realization of a 2-state Kalman Filter The operational amplifier OpAmp, the resistors $R_i$, $R_{o1}$, $R_{o2}$, $R_{o3}$, and the capacitors $C_{o1}$ and $C_{o2}$ that surround it constitute together the realization of the two integrators and the gain matrices F, H, and K. The switches $S_1$ and $S_2$ control the transitions of the filter between three phases of operation. The commands for some of those transitions may be issued by the comparator Cm.

DETAILED DESCRIPTION OF PREFERRED EMBODIMENTS

According to one possible realization of the present invention, the Kalman Filter has two states, namely the light cell output and its time derivative. In the following, the function of the present invention is described based on this realization. It should be well understood however, that the present invention is by no mean limited to the two-state realization, since it is equally possible to devise Kalman Filters with one, three, four states, and more. Similarly, the present invention is by no mean limited to any particular arrangement of amplifiers, resistors, capacitors and analog switches that are used herein only in order to demonstrate the filter concept of operation. This concept can be realized by many different arrangements of many kinds of electronic components. The purpose of the analog switches is to generate the transitions of the Kalman Filter between the integration phase, the hold phase, and the reset phase. These phases and the transitions between them can be generated and controlled by many different arrangements and realizations of switching devices.

A two-state realization of the present invention is shown in FIG. No. 3. The operational amplifier OpAmp, the resistors $R_i$, $R_{o1}$, $R_{o2}$, $R_{o3}$, and the capacitors $C_{o1}$ and $C_{o2}$ that surround it constitute together the realization of the two integrators and the gain matrices F, H, and K, for this two-dimensional case. The states in this version are the light cell output and its first derivative. The switches $S_1$ and $S_2$ control the transition of the filter between three phases of operation. In the integration phase, both switches are closed. The transition to the hold phase is commanded by the comparator Cm, when the output of the light cell becomes comparable in magnitude with the reference voltage $V_{ref}$. In the hold phase both switches are opened. The transition to the reset phase is commanded by an external source, such as the CCD controller, and is issued after the sensor readout has been completed. In the reset phase switch $S_1$ remains opened, while switch $S_2$ is closed.

What is claimed is:

1. A method for sensing light flux, comprising the steps of:
    (a) providing a CCD sensor that, when exposed to the light flux, produces a first signal that is a cumulative measure of the light flux to which said sensor is exposed;
    (b) exposing said sensor to the light flux; and
    (c) transforming said first signal into a second signal that is substantially proportional to the light flux and that is substantially independent of a time of said exposure.

2. The method of claim 1, wherein said second signal includes at least one time derivative of said first signal.

3. The method of claim 2, wherein said second signal includes a weighted combination of a plurality of said time derivatives.

4. The method of claim 1, wherein said second signal is substantially proportional to a first derivative of said first signal.

5. The method of claim 1, further comprising the steps of:
    (d) sensing an impending saturation of said sensor; and
    (e) holding said second signal fixed when said impending saturation is sensed.

6. The method of claim 1, wherein said transforming is effected using an analog circuit.

7. The method of claim 1, wherein said transforming is effected digitally.

8. A method of imaging a scene, comprising the steps of:
    (a) providing an array of a plurality of CCD sensors, each said sensor producing a respective first signal that is a cumulative measure of a light flux impinging on said each sensor;
    (b) focusing light from the scene onto said array, so that each said sensor is exposed to a respective said light flux from a respective spot in the scene; and
    (c) for each said sensor, transforming said respective first signal into a respective second signal that is substantially proportional to said respective light flux and that is substantially independent of a time of said exposure.

9. The method of claim 8, further comprising the step of:
    (d) for each said sensor:
        (i) sensing an impending saturation of said each sensor; and (ii) holding said respective second signal fixed when said impending saturation is sensed.

10. The method of claim 9, wherein said transforming, said sensing and said holding are effected individually and simultaneously.

11. A device comprising:
 (a) a circuit for:
  (i) receiving, from a CCD sensor that is exposed to a light flux, a first signal that is a cumulative measure of said light flux; and
  (ii) transforming said first signal into a second signal that is substantially proportional to said light flux and that is substantially independent of a time of said exposure.

12. The device of claim 11, further comprising:
 (b) a mechanism for:
  (i) sensing an impending saturation of said sensor; and
  (ii) holding said second signal fixed when said impending saturation is sensed.

13. The device of claim 12, wherein said mechanism includes a comparator for comparing said first signal to a reference voltage.

14. A method for sensing light flux, comprising the steps of:
 (a) providing a sensor that, when exposed to the light flux, produces a first signal that is a cumulative measure of the light flux to which said sensor is exposed;
 (b) exposing said sensor to the light flux; and
 (c) transforming said first signal into a second signal that is substantially proportional to the light flux, that is substantially independent of a time of said exposure and that includes at least one time derivative of said first signal.

15. A method for sensing light flux, comprising the steps of:
 (a) providing a sensor that, when exposed to the light flux, produces a first signal that is a cumulative measure of the light flux to which said sensor is exposed;
 (b) exposing said sensor to the light flux; and
 (c) transforming said first signal into a second signal that is substantially proportional to the light flux, that is substantially independent of a time of said exposure and that is substantially proportional to a first derivative of said first signal.

16. A method for sensing light flux, comprising the steps of:
 (a) providing a sensor that, when exposed to the light flux, produces a first signal that is a cumulative measure of the light flux to which said sensor is exposed;
 (b) exposing said sensor to the light flux;
 (c) transforming said first signal into a second signal that is substantially proportional to the light flux and that is substantially independent of a time of said exposure;
 (d) sensing an impending saturation of said sensor; and
 (e) holding said second signal fixed when said impending saturation is sensed.

17. A method for sensing light flux, comprising the steps of:
 (a) providing a sensor that, when exposed to the light flux, produces a first signal that is a cumulative measure of the light flux to which said sensor is exposed;
 (b) exposing said sensor to the light flux; and
 (c) transforming said first signal into a second signal that is substantially proportional to the light flux and that is substantially independent of a time of said exposure, using only an analog circuit.

18. A method of imaging a scene, comprising the steps of:
 (a) providing an array of a plurality of sensors, each said sensor producing a respective first signal that is a cumulative measure of a light flux impinging on said each sensor;
 (b) focusing light from the scene onto said array, so that each said sensor is exposed to a respective said light flux from a respective spot in the scene;
 (c) for each said sensor, transforming said respective first signal into a respective second signal that is substantially proportional to said respective light flux and that is substantially independent of a time of said exposure; and
 (d) for each said sensor:
  (i) sensing an impending saturation of said each sensor; and
  (ii) holding said respective second signal fixed when said impending saturation is sensed.

19. A method of imaging a scene, comprising the steps of:
 (a) providing an array of a plurality of sensors, each said sensor producing a respective first signal that is a cumulative measure of a light flux impinging on said each sensor;
 (b) focusing light from the scene onto said array, so that each said sensor is exposed to a respective said light flux from a respective spot in the scene;
 (c) for each said sensor, transforming said respective first signal into a respective second signal that is substantially proportional to said respective light flux and that is substantially independent of a time of said exposure; and
 (d) for each said sensor:
  (i) sensing an impending saturation of said each sensor; and
  (ii) holding said respective second signal fixed when said impending saturation is sensed;
said transforming, said sensing and said holding being effected individually for each said sensor.

20. A device comprising a circuit for:
 (a) receiving, from a sensor that is exposed to a light flux, a first signal that is a cumulative measure of said light flux; and
 (b) transforming said first signal into a second signal that is substantially proportional to said light flux, that is substantially independent of a time of said exposure, and that includes at least one time derivative of said first signal.

21. A device comprising a circuit for:
 (a) receiving, from a sensor that is exposed to a light flux, a first signal that is a cumulative measure of said light flux; and
 (b) transforming said first signal into a second signal that is substantially proportional to said light flux, that is substantially independent of a time of said exposure and that is substantially proportional to a first derivative of said first signal.

22. A device comprising an analog circuit for:
 (a) receiving, from a sensor that is exposed to a light flux, a first signal that is a cumulative measure of said light flux; and
 (b) transforming said first signal into a second signal that is substantially proportional to said light flux and that is substantially independent of a time of said exposure.

* * * * *

UNITED STATES PATENT AND TRADEMARK OFFICE
CERTIFICATE OF CORRECTION

PATENT NO. : 6,334,098 B1　　　　　　　　　　　　　　　　　　　　Page 1 of 1
DATED : December 25, 2001
INVENTOR(S) : Shefer It is certified that error appears in the above-identified patent and that said Letters Patent is hereby corrected as shown below:

Title page,
Item [75] the inventors name is incorrect — it should show -- Mordechai --
Item [73] the company name is incorrect — it should show -- Trusight Ltd --

Signed and Sealed this

Twenty-first Day of May, 2002

Attest:

Attesting Officer

JAMES E. ROGAN
Director of the United States Patent and Trademark Office